(12) United States Patent
Rivaud et al.

(10) Patent No.: US 11,641,324 B2
(45) Date of Patent: May 2, 2023

(54) OTN TRANSPORT OVER A LEAF/SPINE PACKET NETWORK

(71) Applicant: Ciena Corporation, Hanover, MD (US)

(72) Inventors: Daniel Rivaud, Ottawa (CA); Marc Leclair, Gatineau (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/599,662

(22) PCT Filed: Mar. 31, 2020

(86) PCT No.: PCT/US2020/025866
§ 371 (c)(1),
(2) Date: Sep. 29, 2021

(87) PCT Pub. No.: WO2020/205813
PCT Pub. Date: Oct. 8, 2020

(65) Prior Publication Data
US 2022/0200908 A1    Jun. 23, 2022

Related U.S. Application Data

(63) Continuation of application No. 16/373,677, filed on Apr. 3, 2019, now Pat. No. 10,764,189.

(51) Int. Cl.
*H04J 3/16*    (2006.01)
*H04L 47/125*    (2022.01)
(Continued)

(52) U.S. Cl.
CPC .......... *H04L 47/125* (2013.01); *H04J 3/1658* (2013.01); *H04L 45/24* (2013.01);
(Continued)

(58) Field of Classification Search
CPC ....... H04L 45/24; H04L 47/125; H04J 3/1658
See application file for complete search history.

(56) References Cited

U.S. PATENT DOCUMENTS 8,467,375 B2    6/2013    Blair
8,630,315 B2    1/2014    Rivaud et al.
(Continued)

FOREIGN PATENT DOCUMENTS

EP    3 113 502 A1    1/2017

OTHER PUBLICATIONS

Ethernet Jumbo Frames Version 0.1; Ethernet Alliance Nov. 12, 2009, [retrieved on Nov. 12, 2019], Retrieved from the Internet <URL: http://ethernetalliance.org/wp-content/uploads/2011/10/EA-Ethernet-Jumbo-Frames-v0-1.pdf (Year: 2009).*

(Continued)

*Primary Examiner* — Nathan M Cors
(74) *Attorney, Agent, or Firm* — Baratta Law PLLC; Lawrence A. Baratta, Jr.

(57) ABSTRACT

A network element (16) includes ingress optics (22) configured to receive a client signal; egress optics (30) configured to transmit packets over one or more Ethernet links (20) in a network (12); circuitry (26, 28) interconnecting the ingress optics (22) and the egress optics (30), wherein the circuitry is configured to segment an Optical Transport Network (OTN) signal from the client signal into one or more flows; and provide the one or more flows to the egress optics for transmission over the one or more of Ethernet links (20) to a second network element (18) that is configured to provide the one or more flows into the OTN signal.

20 Claims, 4 Drawing Sheets

(51) Int. Cl.
H04L 45/24 (2022.01)
H04L 45/00 (2022.01)
H04L 47/34 (2022.01)

(52) U.S. Cl.
CPC .............. *H04L 45/38* (2013.01); *H04L 45/70* (2013.01); *H04L 47/34* (2013.01)

(56) References Cited

U.S. PATENT DOCUMENTS

| | | | |
|---|---|---|---|
| 8,848,533 | B1 | 9/2014 | Stuart et al. |
| 10,097,480 | B2 | 10/2018 | Gareau et al. |
| 10,193,688 | B2 | 1/2019 | Gareau et al. |
| 2012/0106339 | A1* | 5/2012 | Mishra .................. H04L 43/106 370/235 |
| 2014/0029426 | A1* | 1/2014 | Saitoh .................... H04L 47/12 370/235 |
| 2015/0381486 | A1 | 12/2015 | Xiao et al. |
| 2017/0310538 | A1* | 10/2017 | Cai .................... H04L 41/0677 |
| 2019/0116115 | A1* | 4/2019 | Kuwabara ............... H04L 49/25 |

OTHER PUBLICATIONS

TPack; ODU0 and ODUflex: A Future-Proof Solution for OTN Client Mapping; Mar. 12, 2012; <retrieved from the internet Jun. 10, 2022><url: https://web.archive.org/web/20120312045120/http://squiz.informatm.com/_data/assets/pdf_file/0007/194623/ODU0_ODUflex_White_Paper_2010_02_15_v1_web.pdf> (Year: 2012).*
OIF Optical Internetworking Forum, IA OIF-OFP-01.0, "OTN Over Packet Fabric Protocol (OFP)," Implementation Agreement, Nov. 2011, pp. 1-40.
R. Winter et al., Ethernet Alliance, "Ethernet Jumbo Frames," Version 0.1, Nov. 12, 2009, pp. 2-10.
Broadcom, BCM88790, "Scalable Fabric Element 9.6 Tbps Self-Routing Switching Element," Mar. 14, 2016, pp. 1-2.
Broadcom, BCM88690, "StraraDNX™ 10Tb/s Scalable Switching Device," Mar. 8, 2018, pp. 1-5.
Microsemi PM5980 DIGI-100GX and PM5990 DIGI-G4 Mobile Fronthaul Solutions Product Information, May 14, 2016, pp. 1-9.
Jun. 25, 2020, International Search Report and Written Opinion for International Application No. PCT/US2020/025866.

* cited by examiner

OTN TRANSPORT OVER A LEAF/SPINE PACKET NETWORK

FIELD OF THE DISCLOSURE

The present disclosure generally relates to networking. More particularly, the present disclosure relates to systems and methods for Optical Transport Network (OTN) transport over a leaf/spine packet network.

BACKGROUND OF THE DISCLOSURE

A leaf/spine network utilizes Equal-Cost Multi-Path (ECMP) routing to spread all flows across multiple network paths. This is typically done by hashing packet headers to choose an output link. The hash is not aware of the bandwidth of a flow (i.e., it does not differentiate between mice and elephant flows), so it distributes flows evenly across links the way Link Aggregation Group (LAG) would. As implied by the names, an elephant flow is an extremely large continuous flow over a network link while a mice flow is a small size flow. A hash might spread flows evenly across many paths, but it can put two elephant flows on one link thereby creating a hotspot of congestion, which leads to packet drops and requires a management system to re-balance the whole network. But even after re-balancing, the elephant flows can lead to poor overall utilization of available path bandwidth. It is therefore desirable to avoid the creation of elephant flows.

OTN transport (i.e., Time Division Multiplexing (TDM)) is typically performed over dedicated OTN networks. In the context of transporting OTN over a packet network, i.e., encapsulation, the conventional approach includes OTN Over Packet Fabric Protocol (OFP) which is an Implementation Agreement from the OIF (IA #OIF-OFP-01.0), November 2011, the contents of which are incorporated by reference herein. Also, pseudo-wires can also be used. OFP and pseudo-wires provide circuit emulation. However, these conventional approaches encapsulate an entire Optical Data Unit 4 (ODU4) into a single elephant packet flow which causes the issues described above.

BRIEF SUMMARY OF THE DISCLOSURE

In an embodiment, a network element includes ingress optics configured to receive a client signal; egress optics configured to transmit packets over one or more Ethernet links in a network; and circuitry interconnecting the ingress optics and the egress optics, wherein the circuitry is configured to segment an Optical Transport Network (OTN) signal from the client signal into one or more flows, and provide the one or more flows to the egress optics for transmission over the one or more of Ethernet links to a second network element that is configured to provide the one or more flows into the OTN signal. The one or more flows can be a plurality of mice flows each having a sequence number for reordering at the second network element, and wherein the one or more Ethernet links are a plurality of Ethernet links, such that the plurality of mice flows are sent over the plurality of Ethernet links. Packets in the plurality of mice flows can have jumbo packet sizes that are at least 2048 B. Each of the plurality of mice flows can have a large sequence number greater than 2 bits. The circuitry can be further configured to utilize Equal-Cost Multi-Path (ECMP) or variants thereof to spread each of the plurality of mice flows over corresponding links. The plurality of Ethernet links can be any of N×10GE, N×25GE, N×50GE, and N×100GE, N is an integer greater than 1, and wherein the OTN signal is an Optical Data Unit 4 (ODU4). The circuitry can be further configured to utilize the plurality of mice flows to measure latency/congestion performance of all paths in the network, and provide the latency/congestion performance to any of a management system, an orchestrator, and a Software Defined Networking (SDN) controller. The one or more flows can be an elephant flow having idle time intervals artificially inserted therein. The circuitry can be further configured to switch the elephant flow to another link based on congestion when there is a gap in the elephant flow greater than a latency difference between a current path and a new path.

In another embodiment, a method includes, in a network element having ingress optics, egress optics, and circuitry interconnecting the ingress optics and the egress optics, receiving a client signal via the ingress optics; segmenting an Optical Transport Network (OTN) signal from the client signal into a one or more flows via the circuitry; providing the one or more flows to the egress optics; and transmitting the one or more flows over the one or more of Ethernet links to a second network element that is configured to provide the one or more flows into the OTN signal. The one or more flows can be a plurality of mice flows each having a sequence number for reordering at the second network element, and wherein the one or more Ethernet links are a plurality of Ethernet links, such that the plurality of mice flows are sent over the plurality of Ethernet links. Packets in the plurality of mice flows can have jumbo packet sizes that are at least 2048 B. Each of the plurality of mice flows can have a large sequence number greater than 2-bits. The method can further include utilizing Equal-Cost Multi-Path (ECMP) or variants thereof to spread each of the plurality of mice flows over corresponding links. The method can further include utilizing the plurality of mice flows to measure latency/congestion performance of all paths in the network; and providing the latency/congestion performance to any of a management system, an orchestrator, and a Software Defined Networking (SDN) controller. The one or more flows can be an elephant flow having idle time intervals artificially inserted therein. The method can further include switching the elephant flow to another link based on congestion when there is a gap in the elephant flow greater than a latency difference between a current path and a new path.

In a further embodiment, an apparatus includes circuitry configured to receive a client signal via ingress optics; circuitry configured to segment an Optical Transport Network (OTN) signal from the client signal into a one or more flows via the circuitry; circuitry configured to provide the one or more flows to egress optics; and circuitry configured to cause transmission of the one or more flows over the one or more Ethernet links to a second network element that is configured to provide the one or more flows into the OTN signal. The one or more flows can be a plurality of mice flows each having a sequence number for reordering at the second network element, and wherein the one or more Ethernet links are a plurality of Ethernet links, such that the plurality of mice flows are sent over the plurality of Ethernet links. The one or more flows can be an elephant flow having idle time intervals artificially inserted therein.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
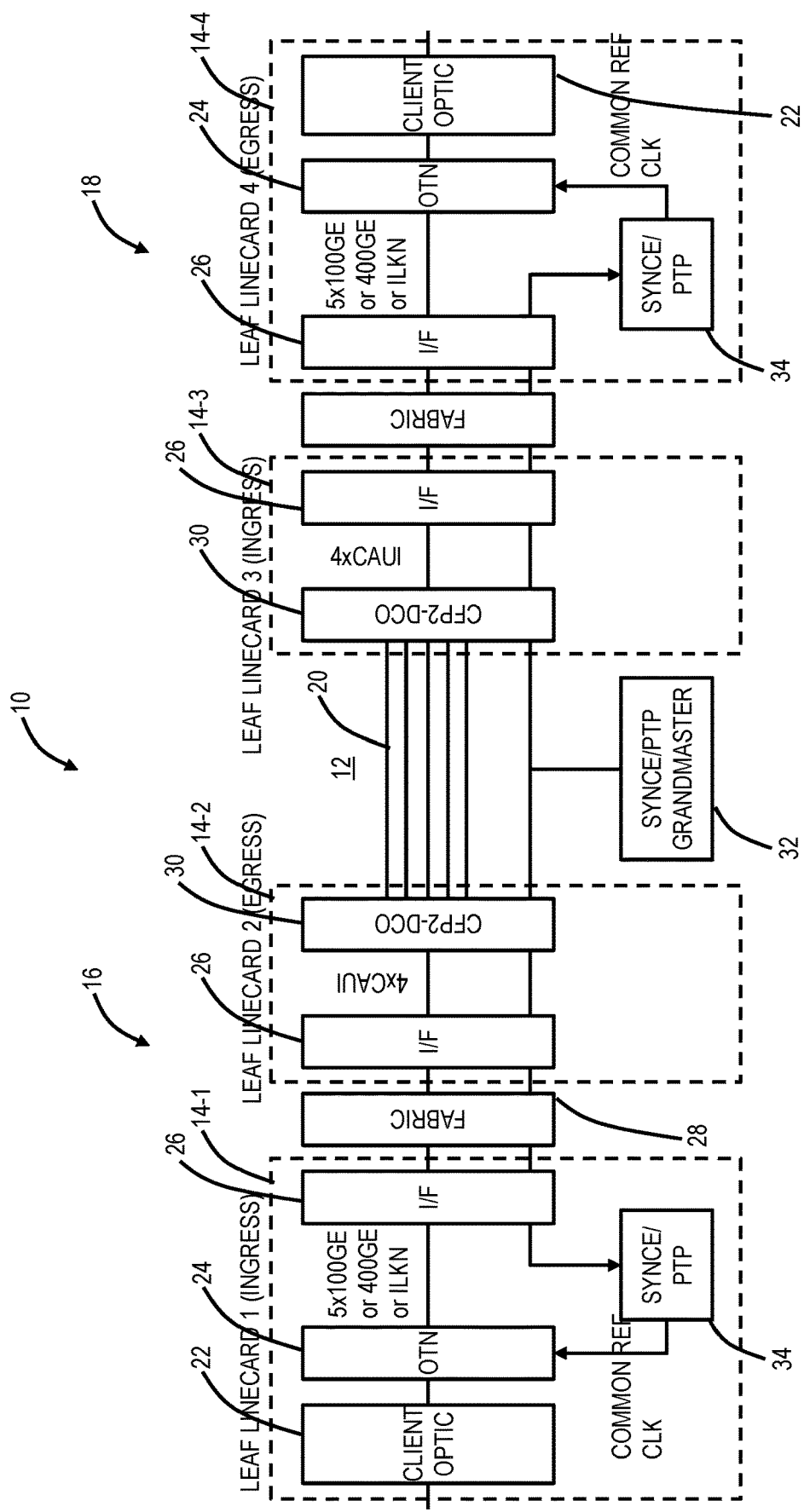
FIG. 1 is a block diagram of a system illustrating a conventional approach to support OTN over a packet/spine network.

The present disclosure relates to systems and methods for Optical Transport Network (OTN) transport over a leaf/spine packet network. Specifically, the systems and methods relate to carrying OTN signals over the leaf/spine packet network where the leaf/spine packet network is not confined to a single data center but distributed over a metropolitan area. The systems and methods overcome limitations with existing chipsets and encapsulation techniques. The present disclosure includes adaptation of OTN to the specific needs of a leaf/spine packet network by segmenting into mice flows at the source, creating gaps in elephant flows that enables some spine switches to change the elephant flow's path, and utilizing a sequence number per flow in addition to a sequence number per packet for the purpose of reducing size of both the sequence numbers; per-flow latency adjustment that relies in in-order packet delivery within the flow. The present disclosure includes providing mice flows with jumbo packets where the packet size dependent on link speeds. The present disclosure also includes utilizing TDM circuit emulation mice flows to measure the latency on a large number of paths for feedback to the management system for path re-balancing operations. A use case of the systems and methods include ODU4 transport over N×10GE, N×25GE, N×50GE, N×100GE.

For reference, the following definitions are used herein:

| | |
|---|---|
| Flow | A sequence of packets that all share the same address headers and are the logical equivalent to a call or connection |
| Flowlet | A burst of packets that is separated from other bursts within the same flow by an idle time interval that is greater than a pre-defined timeout value |
| Long-lived flow | A flow that exists for a period of time that is sufficient for a management system to react to the flow in real time. For a Software Defined Networking (SDN) system, this might be on the order of minutes or longer. For more local node management systems this might be on the order of seconds or longer |
| Mice flow | A low-bandwidth packet flow |
| Elephant flow | A high-bandwidth packet flow |
| TDM service | A constant bitrate service such as OTN, Synchronous Optical Network (SONET), etc. |
| CEM | Circuit Emulation providing the TDM service over a packet network |
| CEM mice flow | A low-bandwidth sequence of packets that includes a CEM header and a payload area that is a segment of the TDM service |
| CEM Elephant Flow | A high-bandwidth sequence of packets that includes a CEM header and a payload area that is a segment of the TDM service |

In a first example embodiment, the present disclosure includes breaking an OTN signal, such as a 100 G ODU4 TDM service, into multiple CEM mice flows, such as 10 10 G flows. Each CEM mice flow has a sequence number, so reordering between the flows is possible (not reordering of packets within a single mice flow).

In a second example embodiment, an OTN signal, such as a 100 G ODU4 TDM service, can be carried by a single 100 G CEM elephant flow that has idle time intervals artificially inserted to create flowlet bursts, such as of 12 Mbps each, for example. The 12 Mb burst would lead to an idle time interval roughly once per second at 100 G rates. That would give the network a chance to re-route the elephant flow roughly once per second. This may only need to be 10 seconds or 1 minute depending on how often the network needs re-balancing. The length of the idle time interval needs to be larger than the difference in delay between the old path and the new path (including fiber latency, buffer latency, switch latency, etc.). This will typically be in the microsecond range. So that's roughly 100 kbits of buffering @ 100 G every time an artificial idle time interval is inserted.

The advantage of the second example embodiment is that it uses less address space since there is only one flow. But it requires more overspeed bandwidth and relies on special spine node silicon to be able to detect flowlets. The nodes that detect the flowlets must also have knowledge of the end-to-end path delays through the network.

FIG. 1 is a block diagram of a system 10 illustrating a conventional approach to support a TDM service such as OTN over a packet/spine network 12. For illustration purposes, the system 10 is shown with four line cards 14-1, 14-2, 14-3, 14-4 with the line cards 14-1, 14-2 part of a network element 16 at a first site and the line cards 14-3, 14-4 part of a network element 18 at a second site. The network elements 16, 18 are interconnected by the packet/spine network 12 which can include a plurality of Ethernet links 20. As described herein, the packet/spine network 12 is a packet network with the multiple Ethernet links 20, not in a single data center, but in a metro or regional deployment, i.e., there are the multiple Ethernet links 20 between the network elements 16, 18. The multiple Ethernet links 20 can be N×10GE, N×25GE, N×50GE, N×100GE, etc. As described herein, a single elephant flow for an ODU4 or similar high-rate OTN signal can overwhelm a single link of the multiple Ethernet links 20. Also, for illustration purposes, FIG. 1 is illustrated in a unidirectional manner from the line card 14-1 as an ingress module to the line card 14-4 as an egress module. The line cards 14-1, 14-4 have similar components as does the line cards 14-2, 14-3.

The line card 14-1 includes client optics 22 configured to receive a client signal, and OTN circuitry 24 configured to map the client signal into an OTN frame, e.g., an ODU4, and to utilize OFP encapsulation to segment the ODU4 into a single packet flow. In an embodiment, the OTN circuitry 24 is the DIGI OTN processor available from Microsemi. The OTN circuitry 24 connects to interface circuitry 26 via any of 5×100GE links, a single 400GE link, or an Interlaken (ILKN) link. In an embodiment, the interface circuitry 26 is the Jericho2c switch from Broadcom which is a packet processor, traffic manager, and fabric interface.

The interface circuitry 26 connects to fabric circuitry 28 in the network element 16 which connects to interface circuitry 26 on the line card 14-2. In an embodiment, the fabric circuitry 28 can be a Fabric Element (FE) from Broadcom. The interface circuitry 26 on the line card 14-2 can connect to a CFP2-DCO 30 (C Form-factor Pluggable-Digital Coherent Optics) via 4×CAUI links (100 Gigabit Attachment Unit Interface), i.e., a standard Ethernet interface.

The CFP2-DCO 30 optically connects to the packet/spine network 12 which can include various spine switches (omitted for illustration purposes) and which ultimately connects to a CFP2-DCO 30 in the line card 14-3. Note, the line cards 14-3, 14-4 include the same components as the line cards 14-1, 14-2 in a reverse direction here in FIG. 1 based on the unidirectional flow. There is a grandmaster clock 32 that can run Synchronous Ethernet (SyncE) and/or Precision Time Protocol (PTP) and communicate with timing circuitry 34 in each of the line cards 14-1, 14-4.

The system 10 provides OTN encapsulation (e.g., an ODU4) over the packet/spine network 12. The OTN circuitry 24 uses OFP encapsulation to segment ODU4 into a single packet flow with the following properties. First, all packets in the flow are limited to the same Media Access Control (MAC) Source Address (SA)/Destination Address (DA)/Qtag, thereby limiting the generation of flows to elephant flows. An ODU4 packet flow is limited to 256-512 B packets; cannot support 2048 B packets to reduce overhead. If using 400GE to connect the OTN circuitry 24 to the interface circuitry 26, the OTN circuitry 24 is limited to 3×ODU4 of OTN bandwidth (if there are no ODU2s for example). If there is a mixture of ODU3s and ODU2s, the OTN circuitry 24 can fill 400GE. If using 5×100GE to connect the OTN circuitry 24 to the interface circuitry 24, the OTN circuitry 24 cannot support ODU4 since this requires at least one link greater than 100 G to the interface circuitry 26 (e.g., requires a 400GE link even if only carrying a single ODU4). If using ILKN to connect the OTN circuitry 24 to the interface circuitry 26, the OTN circuitry 24 can support 5×ODU4; a single ODU4 can be segmented into multiple ILKN channels, but the Layer 2 header is the same. The OFP flow sequence number is limited to 2-bits, so no ability to reassemble multiple flows with different latencies. The interface circuitry 24 cannot perform this reassembly function either.

The interface circuitry 26 and the spine nodes in the packet/spine network 12 use ECMP flow spreading over N×100GE metro network links 20. The spine nodes use a hash on packet fields to spread flows. The hash treats elephant flows the same as mice flows, so elephant flows might get grouped into a single link and cause unbalanced hot spots in the network.

Therefore, it is desirable for OTN to be transported over mice flows with large 2048 B packets. So, a single TDM service such as an ODU4 would be segmented into many 1-10 G CEM mice flows and spread evenly over N×100GE spine links. Reassembly would allow for inter-CEM mice flow latency variation of 50 μs. Large packet size reduces overhead bandwidth. Note, at 100GE link rates, a 2048 B packet causes 163 ns of Head of Line (HOL) blocking, which is acceptable.

Figure 2:
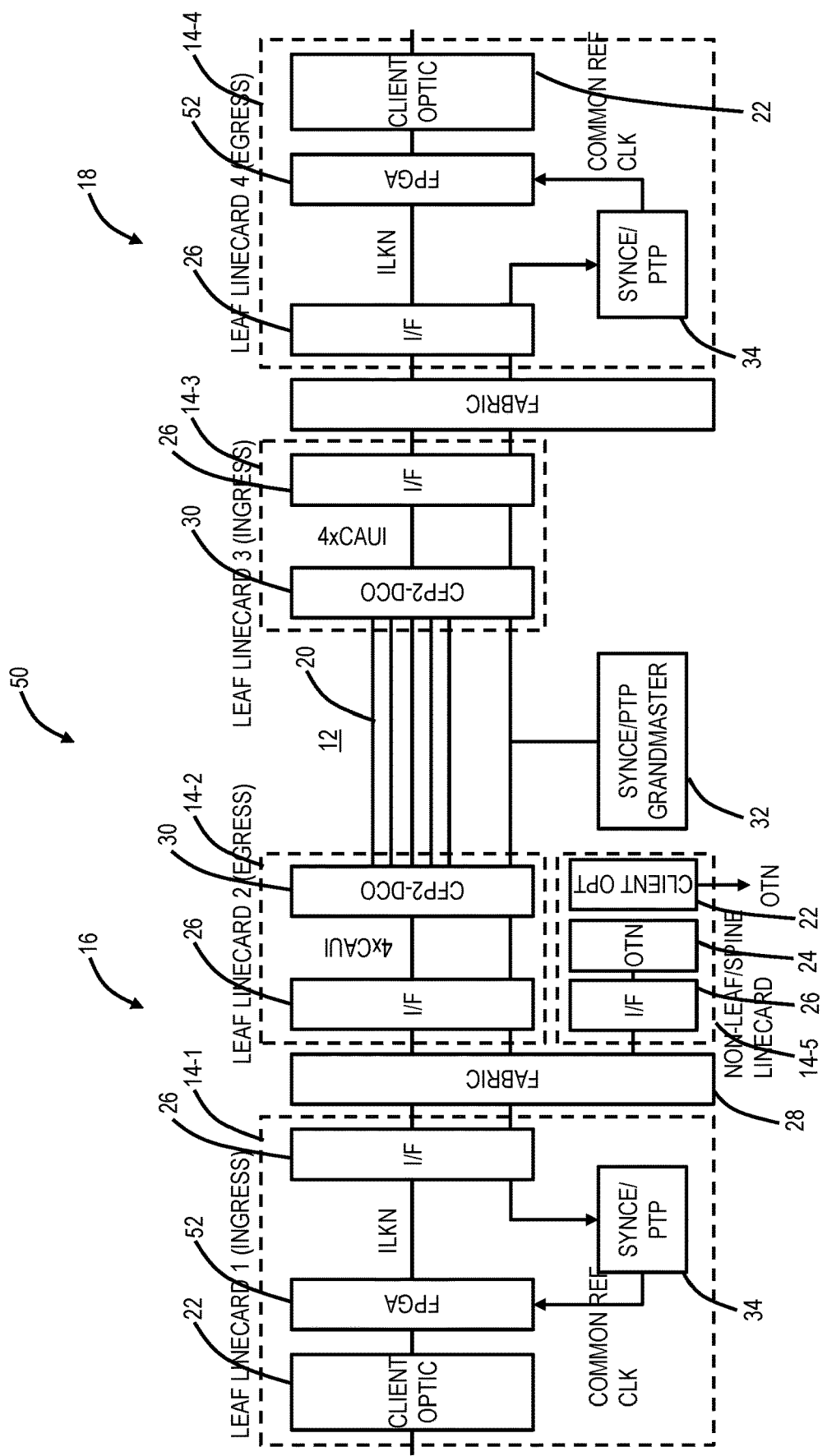
FIG. 2 is a block diagram of a system illustrating the present disclosure to support OTN over the packet/spine network overcoming limitations with existing chipsets and encapsulation techniques.

FIG. 2 is a block diagram of a system 50 illustrating the present disclosure to support OTN over the packet/spine network 12 overcoming limitations with existing chipsets and encapsulation techniques. The system 50 replaces the OTN circuitry 24 with a Field Programmable Gate Array (FPGA) 52 with an ILKN link between the FPGA 52 and the interface circuitry 26. Also, the system 50 can include a line card 14-5 that includes the OTN circuitry 24, the interface circuitry 26, and the client optics 22.

Operation of the system 50 is described from the right (the line card 14-1) to the left (the line card 14-4). At the line card 14-1, local OTN flows not bound for the packet/spine network 12 can be OFP encapsulated via the line card 14-5. For OTN traffic bound for the packet/spine network 12, the FPGA 52 is configured to segment the OTN traffic (e.g., a TDM service such as an ODU4) into multiple CEM mice flows and insert large sequence numbers in the circuit emulation fields. Each CEM mice flow has a unique L2 header. The line card 14-2 handles ECMP flow spreading and spine-compatible MAC-in-MAC or MAC-in-IP encapsulation by the interface circuitry 26.

The line card 14-3 terminates the spine encapsulation and performs L2 forwarding to the line card 14-4 by the interface circuitry 26. The line card 14-4 reassemble flows into the TDM service. An external memory can be used to reassemble flows with up to 150 μs latency variation.

Figure 3:
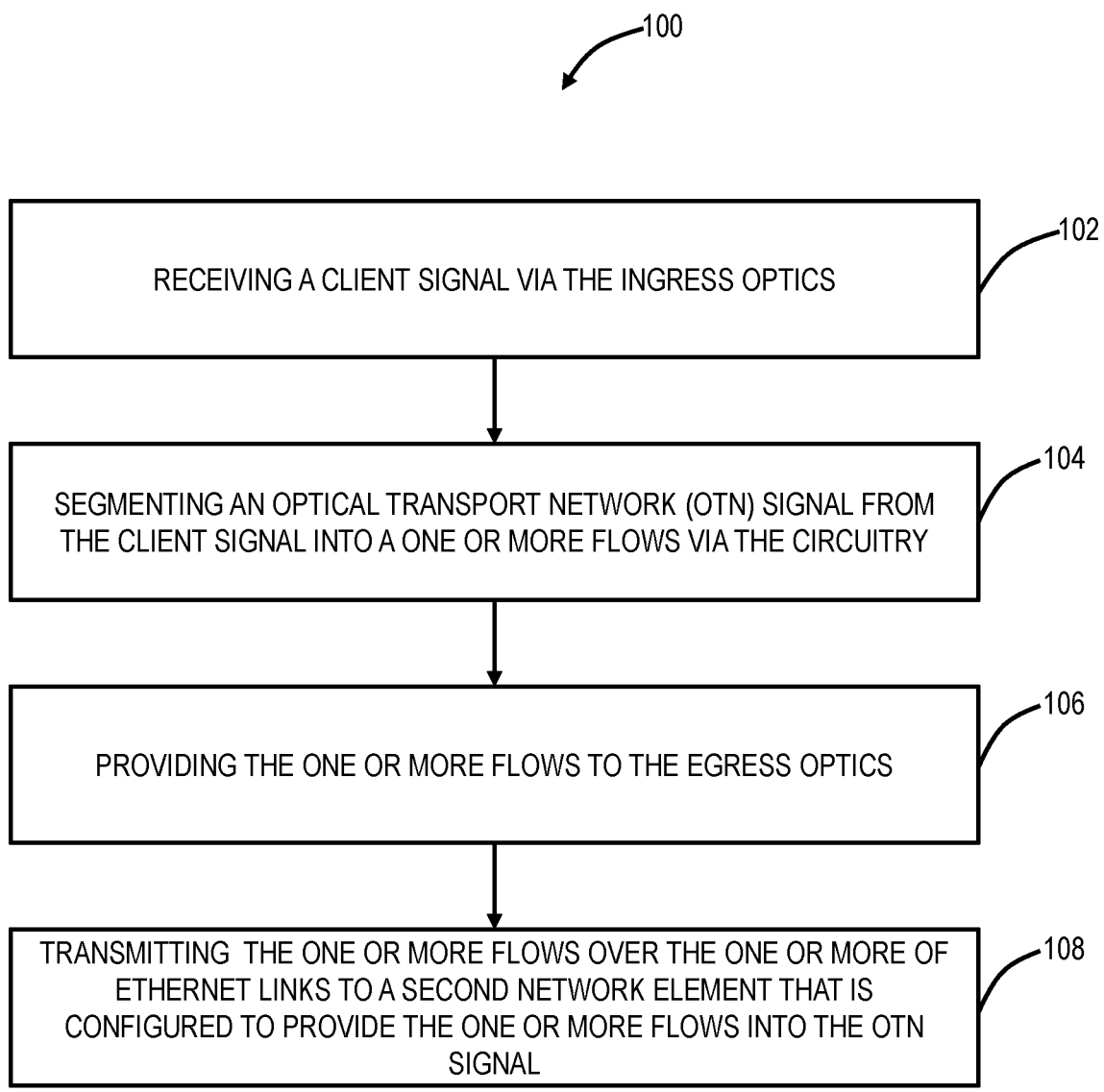
FIG. 3 is a flowchart of a process for transporting OTN signals over the packet/spine network.

FIG. 3 is a flowchart of a process 100 for transporting OTN signals over the packet/spine network 12. For illustration purposes, the process 100 and the other examples described herein use a TDM service as an ODU4 which has a rate of about 104.8 Gbps. Those of ordinary skill in the art will recognize the present disclosure contemplates other OTN signals such as ODU3 (about 40.3 Gbps), Optical Data Unit flexible (ODUflex) (variable rates), Optical Data Unit Cn (ODUCn) where C=100 Gbps and n is an integer, and the like.

The process 100 includes, in a network element having ingress optics, egress optics, and circuitry interconnecting the ingress optics and the egress optics, receiving a client signal via the ingress optics (step 102). In an example, the TDM service can be an OTN signal including an ODU3, an ODU4, an ODUflex with sufficient rate (e.g., >40 Gbps), an ODUCn, and the like. In an embodiment, the OTN signal is preferably an ODU4, ODUflex having a rate comparable to an ODU4 or higher, and an ODUCn. However, the process 100 also contemplated ODU0, ODU1, ODU2, etc. The objective of the process 100 is to segment/break down the high-rate OTN signal for transport over a packet network having multiple links.

The process 100 includes segmenting an Optical Transport Network (OTN) signal from the client signal into a one or more flows via the circuitry (step 104). Optionally, the segmenting can provide a plurality of mice flows each having a unique packet header; utilizing large sequence number per flow; and utilizing jumbo packet sizes. The CEM mice flows prevent the issues caused by elephant flows, such as a single TDM service as an ODU4 into an elephant flow that can cause congestion in the packet/spine network 12.

The process 100 includes providing the one or more flows to the egress optics (step 106), and transmitting the one or more flows over the one or more of Ethernet links to a second network element that is configured to provide the one or more flows into the OTN signal (step 108).

In an embodiment, the one or more flows are a plurality of mice flows each having a sequence number for reordering at the second network element, and wherein the one or more Ethernet links are a plurality of Ethernet links, such that the plurality of mice flows are sent over the plurality of Ethernet links.

Since each mice flow can follow a different path in the packet/spine network 12, one mice flow might arrive earlier/later than another mice flow, perhaps hundreds of microseconds. So, a large Sequence Number (SN) is required, e.g., greater than 2-bits, and the OIF OFP standard has an inadequate 2-bit sequence number. It might seem desirable to put the SN on each packet, but that burns unnecessary bandwidth. Instead, in an embodiment, the present disclosure proposes a better technique of an SN per flow (rather than per packet) since the latency of the flow is what is important, not the latency of each packet within the flow. And to deal with lost packets, several repeated SN values can be repeated in a flow. The key enabler is that packet/spine network 12 delivers all packets within a flow in order. Even if the SN is placed on each packet, the extra overhead is a small percentage of a jumbo frame, so the overhead burden is low.

Another aspect includes coupling CEM mice flows with jumbo packets. So, every packet within the CEM mice flow should be 2048-9000 B large. This improves bandwidth efficiency since the payload is large relative to the packet header. At 100GE link rates, a 2048 B packet would only cause 163 ns of HOL blocking, which is very small and manageable. So, a 2048 B packet behaves like a very small cell quantum with today's extremely fast link rates—the prior art limits OTN-over-packet to 512 B, which is bandwidth wasteful.

People sometimes think that mice flow means "flows with small packets," but this is not the right meaning. The correct meaning for mice flows is "flows with low bandwidth that can have small or large packets." When OTN is encapsulated in packets, the number of packet flows and the packet size can be chosen. For example, here are possible choices for the encapsulation of a 100 G ODU4: 1) Segment into one hundred 1 G mice flows each with a 9 kB packet size, 2) Segment into one hundred 1 G mice flows each with a 64 B packet size, or 3) Segment into a single 100 G elephant flow of 64 B packets.

As described herein, elephant flows are not great in Leaf/Spine networks, so the present disclosure utilizes CEM mice flows in one aspect. The CEM mice flows can have either small packets or large packets. The idea is that choosing large packets reduces overhead inefficiencies relative to choosing small packets. Preferably, 1 G CEM mice flows are not required; 10 G flows are perfectly fine in modern Leaf/Spine networks. As described herein, the transmitting can include ECMP flow spreading and spine-compatible MAC-in-MAC or MAC-in-IP encapsulation in the packet/spine network 12. Other variants of ECMP such as weight ECMP can be used.

Re-ordering may add latency, but this is addressed. For multi-path delay differential, if the fastest path is 0 µs and the slowest path is 10 µs, then the cost of path spreading can be a 10 µs re-assembly buffer. There are knobs to play with here, e.g., a given OTN flow can be restricted to similar-delay paths, etc. Depending on the rate, jumbo packets can introduce latency since a full packet must be received before it can be processed. There are knobs here as well; a mice flow might be 10 G (does not have to be 1 G). Packet-only timing distribution can have more jitter than a SyncE-assisted packet timing distribution. If there are Boundary Clocks at each hop, that can help.

In addition to enabling OTN circuit emulation over a packet network, the present disclosure can also leverage particular properties of the OTN CEM mice flows (predictable bandwidth, following many paths, etc.) to improve leaf/spine performance for packet-only flows. In the process 100, the mice flows get reordered and reassembled into a single high-speed OTN signal (e.g., ODU4) flow at the far end. The mice flows can gather information about the network 12 that is not possible in other ways. For example, the mice flows give a good representation of the latency/congestion performance of all the paths in the leaf/spine mesh network 12. The re-ordering process inherently provides this latency measurement that can be output to a management system, orchestrator, an SDN controller, etc. This can further be used to adjust the paths taken by packet-only flows (i.e., not carrying OTN) in order to balance bandwidth in the spine. So, the TDM traffic allows a constant probing of the network that can improve the performance of the data-only packets by allowing better measurement and response. Examples of the measurements can utilize timestamp fields, a bidirectional round-trip measurement, etc.

The present disclosure solves another problem: in existing approaches that create a packet elephant flow to carry an ODU4, a single 100GE link cannot carry the ODU4 due to the additional overhead which requires more than 100 G of bandwidth. Existing solutions solve this by requiring an ILKN interface, but that is not common in chipsets (not supported by Tomahawk3, Jericho2, etc.) and it does not work over a network. By breaking the ODU4 into mice flows, this problem is solved, and an ODU4 can be transmitted over an N×10G, N×25G, N×50G, or N×100G interface (local to the board or network).

The process 100 also works alongside 1588 PTP protocol that distributes phase/frequency timing to the endpoints for the purpose of re-creating OTN timing.

In another embodiment, in the process 100, the one or more flows are a CEM elephant flow having idle time interval artificially inserted therein. Some spine chipsets (e.g., Broadcom Tomahawk3) have the ability to break up an elephant flow over multiple paths whenever there is a sufficient idle time interval in the flow. So, the present disclosure optionally allows the encapsulation of a TDM service such as an ODU4 into a single CEM elephant flow with artificially inserted idle time intervals, which the spine can take advantage of to spread the bandwidth over multiple links 20. To create an idle time interval in the CEM elephant flow, some degree of overspeed is required. This is not an issue since an ODU4 already requires slightly more bandwidth than can be carried in a single 100GE. So, the present disclosure can increase the overspeed slightly to make up for the zero-bandwidth idle time interval. The idle time interval lengths can be configurable. Specifically, the idle time interval length needs to be greater than the maximum difference in latency between worst-case spine paths. Since leaf/spine is typically a mesh and TDM rides at top Quality of Service (QoS), the latency differential is in the microsecond range. This level of buffering is achievable.

In multi-path Ethernet networks such as the network 12, packets from a single flow could traverse different paths and therefore arrive out-of-order. To deal with this, the standard approach is to restrict a single flow to follow a single path—same idea as an Ethernet Link Aggregation Group (LAG). That way all packets experience the same latency since they always follow a single path. The problem with this technique is that once a long-lived flow is on a path, it cannot be moved. The inability to move it can lead to fabric inefficiencies due to the inability to adapt as congestion changes. But there is a way to move a long-lived flow without introducing re-ordering issues. If there is a gap in the flow that is greater than the latency difference between the two paths, then the flow can be moved to a new path during the gap and not experience any re-ordering. Let's say the new path is 1 μs faster than the old path. Packets on the new path would arrive before packets on the old path. But if the gap in the long-lived flow is greater than 1 μs, then the packets on the new path will not arrive earlier.

Advantageously, the process 100 provides Private Line OTN transport service over an Ethernet Switched Network, transport over high Packet Delay Variation (PDV) Ethernet Switched networks, distribution of larger elephant flows over mice flows, support for larger packets to reduce overhead, addition of packet re-ordering capabilities, addition of SA/DA and port-based scheduling, support for larger PDV with larger SN, and the like.

Figure 4:
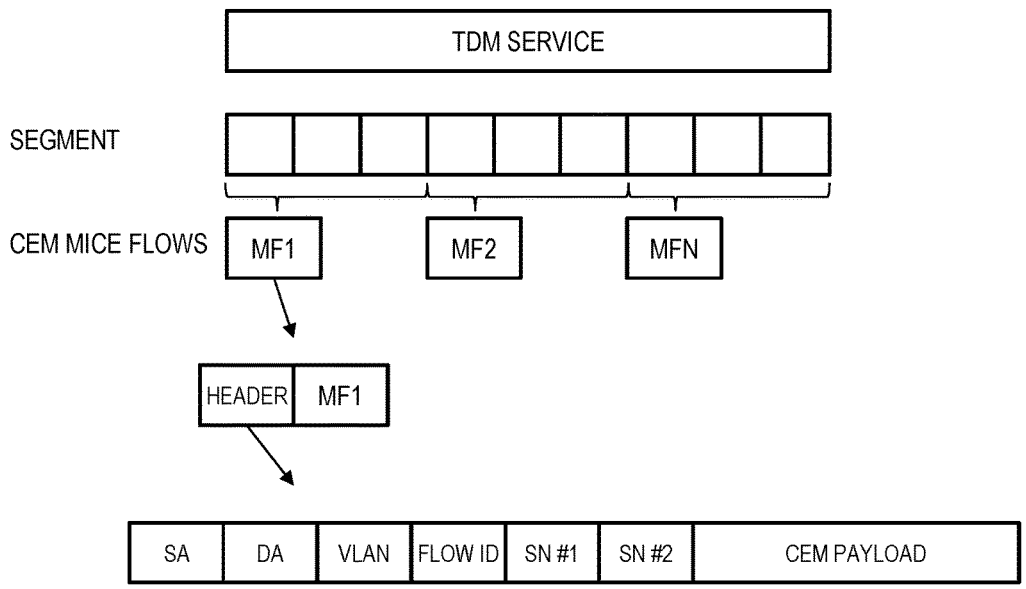
FIG. 4 is a block diagram illustrating a TDM service that is segmented into a plurality of Circuit Emulation (CEM) mice flows.

FIG. 4 is a block diagram illustrating a TDM service that is segmented into a plurality of CEM mice flows. Again, the TDM service can include OTN, SONET, etc. such as an ODU4. The TDM service is segmented, e.g., for an ODU4, segmented from 100 G to 10 10 G segments. The segments are provided into CEM mice flows, e.g., MF1, MF2, ... MFN, where N>1. Each CEM mice flow has a header and a payload. The header can include a Source Address (SA), Destination Address (DA), a Virtual Local Area Network (VLAN) identifier, a flow identifier, Sequence Numbers (SN) 1 and 2, etc.

Figure 5:
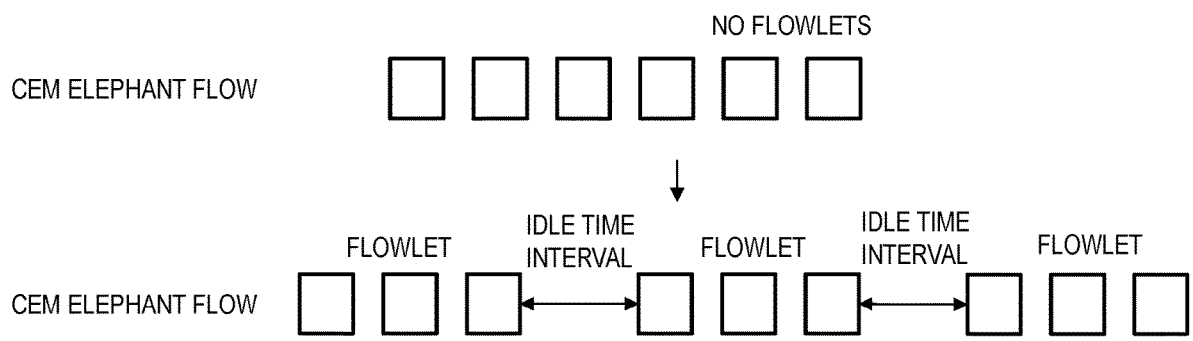
FIG. 5 is a block diagram illustrating a TDM service over a CEM elephant flow with artificially inserted idle time intervals.

FIG. 5 is a block diagram illustrating a TDM service over a CEM elephant flow with artificially inserted idle time intervals. The TDM service, such as an ODU4, is provided in a CEM elephant flow with no flowlets. The present disclosure includes insertion of the idle time intervals to include flowlets. This enables the CEM elephant flow to be switched to other paths during an idle time interval.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network element comprising:
    ingress optics configured to receive a client signal;
    egress optics configured to transmit packets over Ethernet links in a network; and
    circuitry interconnecting the ingress optics and the egress optics, wherein the circuitry is configured to
        segment an Optical Transport Network (OTN) signal from the client signal into a plurality of mice flows each having bandwidth of about 10 Gb/s or less and having packet sizes of about 64 B or larger, and
        provide the plurality of mice flows to the egress optics for transmission over the Ethernet links to a second network element in the network that is configured to provide the plurality of mice flows to send the OTN signal, wherein at least two of the plurality of mice flows follow different paths in the network while carrying the segmented OTN signal.

2. The network element of claim 1, wherein the plurality of mice flows each have a sequence number for reordering at the second network element.

3. The network element of claim 1, wherein packets in the plurality of mice flows have jumbo packet sizes that are at least 2048 B.

4. The network element of claim 1, wherein each of the plurality of mice flows has a large sequence number greater than 2 bits.

5. The network element of claim 1, wherein the circuitry is further configured to
    utilize Equal-Cost Multi-Path (ECMP) or variants thereof to spread each of the plurality of mice flows over corresponding links.

6. The network element of claim 1, wherein the Ethernet links are any of N×10GE, N×25GE, N×50GE, and N×100GE, N is an integer greater than 1, and wherein the OTN signal is an Optical Data Unit 4 (ODU4).

7. The network element of claim 1, wherein the circuitry is further configured to
    utilize the plurality of mice flows to measure latency/congestion performance of one or more paths in the network, and
    provide the latency/congestion performance to any of a management system, an orchestrator, and a Software Defined Networking (SDN) controller.

8. An apparatus comprising circuitry configured to
    segment an Optical Transport Network (OTN) signal from a client signal into a plurality of mice flows each having bandwidth of about 10 Gb/s or less and having packet sizes of about 64 B or larger, and provide the plurality of mice flows to an egress optics for transmission over Ethernet links to a second network element in a network that is configured to provide the plurality of mice flows to send the OTN signal, wherein at least two of the plurality of mice flows follow different paths in the network while carrying the segmented OTN signal.

9. The apparatus of claim 8, wherein the plurality of mice flows each have a sequence number for reordering at the second network element.

10. The apparatus of claim 8, wherein packets in the plurality of mice flows have jumbo packet sizes that are at least 2048 B.

11. The apparatus of claim 8, wherein each of the plurality of mice flows has a large sequence number greater than 2 bits.

12. The apparatus of claim 8, wherein the circuitry is further configured to utilize Equal-Cost Multi-Path (ECMP) or variants thereof to spread each of the plurality of mice flows over corresponding links.

13. The apparatus of claim 8, wherein the Ethernet links are any of N×10GE, N×25GE, N×50GE, and N×100GE, N is an integer greater than 1, and wherein the OTN signal is an Optical Data Unit 4 (ODU4).

14. The apparatus of claim 8, wherein the circuitry is further configured to utilize the plurality of mice flows to measure latency/congestion performance of one or more paths in the network, and provide the latency/congestion performance to any of a management system, an orchestrator, and a Software Defined Networking (SDN) controller.

15. A method comprising:

in a network element having ingress optics, egress optics, and circuitry interconnecting the ingress optics and the egress optics, receiving a client signal via the ingress optics;

segmenting an Optical Transport Network (OTN) signal from the client signal into a plurality of mice flows each having bandwidth of about 10 Gb/s or less and having packet sizes of about 64 B or larger, via the circuitry;

providing the one or more flows to the egress optics; and transmitting the plurality of mice flows over Ethernet links to a second network element that is configured to provide the plurality of mice flows to send the OTN signal, wherein at least two of the plurality of mice flows follow different paths in the network while carrying the segmented OTN signal.

16. The method of claim 15, wherein the plurality of mice flows each have a sequence number for reordering at the second network element.

17. The method of claim 15, wherein packets in the plurality of mice flows have jumbo packet sizes that are at least 2048 B.

18. The method of claim 15, wherein each of the plurality of mice flows has a large sequence number greater than 2 bits.

19. The method of claim 15, further comprising utilizing Equal-Cost Multi-Path (ECMP) or variants thereof to spread each of the plurality of mice flows over corresponding links.

20. The method of claim 15, wherein the Ethernet links are any of N×10GE, N×25GE, N×50GE, and N×100GE, N is an integer greater than 1, and wherein the OTN signal is an Optical Data Unit 4 (ODU4).

* * * * *